United States Patent Office 2,867,598
Patented Jan. 6, 1959

---

2,867,598

COMPOSITION COMPRISING POLYVINYL CHLORIDE PLASTICIZED WITH A TURPENTINE-DICARBOXYLIC ESTER ADDUCT

Joachim Dazzi, Dayton, Ohio, assignor to Monsanto Chemical Company, St. Louis, Mo., a corporation of Delaware No Drawing. Application July 21, 1955
Serial No. 523,608

3 Claims. (Cl. 260—29.8)

The present invention relates to compositions comprising polymers of vinyl halides and relates more particularly to compositions comprising said polymers plasticized with addition products of turpentine and certain dicarboxylates.

According to the invention, resinous compositions of improved low temperature flexibility properties are prepared by plasticizing vinyl chloride polymers with certain addition products of turpentine and a dicarboxylate selected from the class consisting of alkyl fumarates and maleates having from 1 to 8 carbon atoms in the alkyl radical. The addition products which I employ as plasticizers are known compounds being readily obtainable by the Diels-Alder reaction of turpentine with the fumarate or maleate. The presently useful Diels-Alder addition products, or adducts, are those which boil below 200° C., at a pressure of less than 2 mm. of mercury. They are probably 1:1 adducts of the fumarate or maleate and the $\alpha$- and $\beta$-pinenes of the turpentine. For convenience, they will be referred to hereafter simply as turpentine-fumarate or turpentine-maleate adducts boiling below said temperature.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument and Manufacturing Company is used for this determination and expresses the hardness in units of from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions' usefulness as elastomers.

*Volatility.*—Just as a decrease in temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The invention is further illustrated, but not limited, by the following examples:

Example 1

This example shows the plasticizing efficiency of a turpentine-fumarate adduct prepared by heating 388 grams (1.7 moles) of butyl fumarate with 462 grams (3.4 moles) of wood turpentine at a temperature of from 210 to 220° C. for 12 hours, and distilling the resulting reaction product to give a fraction, B. P. 160–200° C. at 1 mm. A mixture consisting of 40 parts by weight of said fraction and 60 parts by weight of polyvinyl chloride was milled to a homogeneous blend. During the milling there was observed substantially no fuming and discoloration. A molded sheet of the milled blend was clear, transparent and substantially colorless. Testing of the molded sheet by the testing procedures herein described gave a low temperature flexibility value of minus 29.2° C., a volatility value of 14.0 percent, a water absorption value of 0.09 percent, and a solids loss value of 0.51 percent. It had a hardness of 77 before the volatility test and a hardness of 79 after the volatility test. When subjected to heat for 30 minutes at a temperature of 325° F., the color and clarity of the molded product was unchanged.

Example 2

This example shows the plasticizing efficiency of a turpentine-maleate product prepared by heating 388 grams (1.7 moles) of butyl maleate and 462 grams (3.40 moles) of turpentine at a temperature of 220° C. for 12 hours and distilling the resulting reaction product to give a fraction, B. P. 181–200° C./1 mm. Forty parts of said fraction was incorporated with 60 parts of polyvinyl chloride as in Example 1 and molded test specimens prepared from the resulting product were tested by the procedures described above. The low temperature flexibility value of the present plasticized composition was found to be minus 26.4° C., and the volatility was found to be 13.7 percent. When subjected to heat at a temperature of 325° F. for a period of 30 minutes, the clarity and color of the molded sheet were substantially unchanged.

The adducts of turpentine and the following alkyl maleates or fumarates were also found to impart very good flexibility properties to polyvinyl chloride and to be compatible therewith: methyl fumarate, isopropyl fumarate, amyl fumarate, 2-ethylhexyl fumarate, ethyl maleate, n-octyl maleate, n-hexyl maleate, etc.

While the above example shows only a composition in which the ratio of plasticizer to polymer content is 40:60, the content of addition product to polyvinyl chloride may be widely varied, depending upon the properties desired in the final product. For many purposes a plasticizer content, of say, from only 10 percent to 20 percent is preferred. The present addition products are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The present addition products are of general utility in softening vinyl chloride polymers. They may be used as the only plasticizing component in a compounded vinyl chloride polymer or they may be used in conjunction with other plasticizers.

What is claimed is:

1. A resinous composition comprising polyvinyl chloride plasticized with an addition product of turpentine and a dicarboxylate selected from the class consisting of alkyl fumarates and maleates having from 1 to 8 carbon atoms in the alkyl radical, said addition product having a boiling point of below 200° C. at a pressure of less than 2 mm. of mercury.

2. A resinous composition comprising polyvinyl chloride plasticized with an adduct of turpentine and butyl maleate, said adduct having a boiling point of below 200° C. at a pressure of less than 2 mm. of mercury.

3. A resinous composition comprising polyvinyl chloride plasticized with an adduct of turpentine and butyl fumarate, said adduct having a boiling point of below 200° C. at a pressure of less than 2 mm. of mercury.

References Cited in the file of this patent

UNITED STATES PATENTS 2,234,958   Bradley et al. _____ Mar. 18, 1941

OTHER REFERENCES

Pinto; Plastics (of Chicago), January 1945, pages 24, 26, and 104.

Loeblich et al.; Ind. Eng. Chem., vol. 47, April 1955, pages 855–858.